(12) United States Patent
Uryu

(10) Patent No.: US 7,792,619 B2
(45) Date of Patent: Sep. 7, 2010

(54) ELECTRICALLY DRIVEN POWER STEERING SYSTEM FOR VEHICLE

(75) Inventor: Nobuhiko Uryu, Kariya (JP)

(73) Assignee: DENSO CORPORATION, Kariya (JP)

( * ) Notice: Subject to any disclaimer, the term of this patent is extended or adjusted under 35 U.S.C. 154(b) by 971 days.

(21) Appl. No.: 11/052,080

(22) Filed: Feb. 8, 2005

(65) Prior Publication Data
US 2005/0205344 A1 Sep. 22, 2005

(30) Foreign Application Priority Data
Feb. 12, 2004 (JP) .............................. 2004-035300

(51) Int. Cl.
*B60L 9/00* (2006.01)
*B62D 6/00* (2006.01)
*B62D 5/06* (2006.01)

(52) U.S. Cl. .............................. 701/41; 701/22; 701/42; 701/43; 701/70; 180/422; 180/446; 180/421; 180/443

(58) Field of Classification Search .................. 180/446, 180/442, 421, 443; 318/432; 91/375 A; 701/22, 41–43, 70–72
See application file for complete search history.

(56) References Cited

U.S. PATENT DOCUMENTS

| | | | | |
|---|---|---|---|---|
| 4,611,682 A | * | 9/1986 | Yasuda et al. ................ | 180/446 |
| 4,771,845 A | * | 9/1988 | Shimizu ...................... | 180/446 |
| 4,789,040 A |   | 12/1988 | Morishita et al. | |
| 4,800,974 A | * | 1/1989 | Wand et al. .................. | 180/446 |
| 4,890,683 A | * | 1/1990 | Matsuda et al. ............. | 180/444 |
| 5,053,966 A |   | 10/1991 | Takahashi et al. | |
| 5,103,715 A | * | 4/1992 | Phillips ...................... | 91/375 A |
| 6,032,091 A |   | 2/2000 | Noro et al. | |
| 6,148,943 A |   | 11/2000 | Kodaka et al. | |
| 6,161,068 A | * | 12/2000 | Kurishige et al. ............. | 701/41 |
| 6,226,587 B1 | * | 5/2001 | Tachihata et al. ............. | 701/72 |

(Continued)

FOREIGN PATENT DOCUMENTS

EP 0 361 725 A1 4/1990

(Continued)

OTHER PUBLICATIONS

Search Report from French Patent Office issued on May 29, 2006 for the corresponding French patent application No. FR 0501160.

*Primary Examiner*—Khoi Tran
*Assistant Examiner*—Ian Jen
(74) *Attorney, Agent, or Firm*—Posz Law Group, PLC

(57) ABSTRACT

An electrically driven power steering system for a vehicle comprises a steering sensor for detecting a steering operation of a steering wheel and a power steering control unit, which receives a command signal from a vehicle movement total control unit, calculates a target steering assist torque from a steering signal from the steering sensor and the command signal and drives a steering assist electric motor in accordance with the above calculated target steering assist torque. The power steering control unit further calculates a feasible torque to be generated at the steering assist electric motor, and drives the steering assist electric motor at the feasible torque, when the feasible torque is lower than the target steering assist torque, namely when a driving current to the electric motor should be limited due to an increased temperature of the electric motor and so on.

5 Claims, 7 Drawing Sheets

U.S. PATENT DOCUMENTS

| | | | | |
|---|---|---|---|---|
| 6,268,669 | B1* | 7/2001 | Wakao et al. | 310/67 R |
| 6,334,503 | B1* | 1/2002 | Fukumura et al. | 180/446 |
| 6,816,765 | B2* | 11/2004 | Yamamoto et al. | 701/41 |
| 6,904,346 | B2* | 6/2005 | Higashi et al. | 701/41 |
| 2002/0124663 | A1* | 9/2002 | Tokumoto et al. | 73/862.333 |
| 2003/0045991 | A1* | 3/2003 | Isogai et al. | 701/96 |
| 2003/0144784 | A1* | 7/2003 | Tashiro et al. | 701/54 |
| 2003/0187559 | A1* | 10/2003 | Higashi et al. | 701/41 |
| 2003/0193305 | A1* | 10/2003 | Crowley | 318/432 |
| 2004/0026161 | A1* | 2/2004 | Takatsuka et al. | 180/446 |
| 2004/0162663 | A1* | 8/2004 | Kogure et al. | 701/72 |
| 2004/0217729 | A1* | 11/2004 | Recker | 318/807 |
| 2004/0222037 | A1* | 11/2004 | Takatsuka et al. | 180/446 |
| 2005/0205344 | A1* | 9/2005 | Uryu | 180/446 |
| 2005/0209742 | A1* | 9/2005 | Sakakibara et al. | 701/1 |
| 2005/0222731 | A1* | 10/2005 | Ghoneim | 701/41 |

FOREIGN PATENT DOCUMENTS

| | | |
|---|---|---|
| EP | 1 304 276 A1 | 4/2003 |
| JP | A-6-56015 | 3/1994 |

* cited by examiner

ELECTRICALLY DRIVEN POWER STEERING SYSTEM FOR VEHICLE

CROSS REFERENCE TO RELATED APPLICATION

This application is based on Japanese Patent Application No. 2004-35300 filed on Feb. 12, 2004, the disclosures of which is incorporated herein by reference.

FIELD OF THE INVENTION

The present invention relates to an electrical power steering system for a vehicle, and furthermore to an integrated total control system for the vehicle.

BACKGROUND OF THE INVENTION

It is known in the art that multiple control systems for a vehicle are connected with each other to perform a coordinated control for the vehicle, in which multiple control systems operate in cooperation with each other. The coordinated control for the vehicle between an electrical power steering system and an anti-braking system (ABS), or between the electrical power steering system and an automatic braking system, is disclosed in Japanese Patent Publications H6-56015 or H11-198845.

In the electrical power steering system, in which a steering assist torque is applied to a steering device by an electric motor, a driving current to the electric motor is limited (or the driving current is cut off) in some cases, in order that an overheat of the electric motor or a control unit for the electric motor is prevented, or due to a decrease of power voltage to be applied to the electric motor. In such prior art systems, however, a command signal (command value) outputted by an external control unit (a control unit for a vehicle movement total control) for a target steering angle, a target tire steering angle or a target power assist torque is independently calculated from the conditions of the electrical power steering device. And thereby a desired movement of the vehicle can not be realized in the case that the driving current to the electric motor is limited.

Namely, even in the case that the electrical power steering system is controlled by the command signal from the vehicle movement total control unit, a deviation may occur between the command signal (the command value) for the target steering angle, the target tire steering angle or the target power assist torque and an actual control value from the control unit for the electrical power steering system, when the driving current to the electric motor is limited to prevent the overheat of the electric motor or power devices for the motor control or due to the decrease of the power voltage to the electric motor. As a result, the desired movement of the vehicle can not be obtained.

When the driving current to the electric motor is limited, information of such an operational condition of the current limit is transmitted to other control units (including the vehicle movement total control ECU). In some of prior art systems, the other control units (including the vehicle movement total control unit) stop a transmission of a command signal or any other signals to the control unit for the electrical power steering system, when the other control units receive the signal (information) for the current limit operation. With such prior art systems, the desired movement of the vehicle can not be realized.

SUMMARY OF THE INVENTION

It is, therefore, an object of the present invention to provide an electrical power steering system for a vehicle, in which the electrical power steering system can operate in a coordinated control with other vehicle control systems, even during a period in which a driving current to an electric motor of the power steering system is limited.

According to a feature of the present invention, an electrical power steering system for a vehicle comprises a steering sensor for detecting a steering operation of a driver's wheel (a rotational angle of the steering wheel) and a power steering control unit, which receives a command signal from a vehicle movement total control unit, calculates a target steering assist torque from a steering signal from the steering sensor and the command signal from the vehicle movement total control unit, and drives a steering assist electric motor in accordance with the above calculated target steering assist torque.

The power steering control unit further calculates a feasible torque to be generated at the steering assist electric motor, and drives the steering assist electric motor at the feasible torque, when the feasible torque is lower than the target steering assist torque, namely when a driving current to the electric motor should be limited due to an increased temperature of the electric motor and so on.

In addition, the power steering control unit transmits, to the vehicle movement total control unit, the information of the motor operation, in which the steering assist electric motor is operated with the limited driving current.

In the conventional system, when the driving current to the steering assist electric motor is limited due to the increased temperature of the electric motor and so on, the required control for the power steering control unit is substituted by operation(s) of the other control systems, to perform the whole control corresponding to the command signal from the vehicle movement total control unit to the power steering control unit.

According to the present invention, however, the steering assist electric motor is operated at the feasible torque, even when the electric motor should be operated with the limited driving current. And the control amount corresponding to a difference between the target steering assist torque and the feasible torque can be performed by the other control systems. As a result, an optimum vehicle control can be realized.

According to another feature of the present invention, the power steering control unit calculates the feasible torque based on at least one of the following amounts or values, which are a power voltage to be applied to the power steering control unit, a temperature of or a temperature of a portion adjacent to the power steering control unit, a temperature of the steering assist electric motor, a driving current flowing through the steering assist electric motor, a rotational speed of the steering assist electric motor, and a vehicle speed.

When the power voltage to the power steering control unit (to the electric motor) is varied, for example, then the feasible output (torque) of the electric motor driven by such power voltage is correspondingly varied. Accordingly, when the power voltage is decreased to become lower than a predetermined value, the driving current is limited in response to the decreased power voltage and at the same time such decrease of the output at the electric motor is transmitted to the vehicle movement total control unit. Then, the other control systems compensate a portion of the control which can not be performed by the power steering control system, so that the total vehicle movement is controlled, as a whole, in an optimum manner and thereby an unpleasant feeling to the driver can be avoided.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
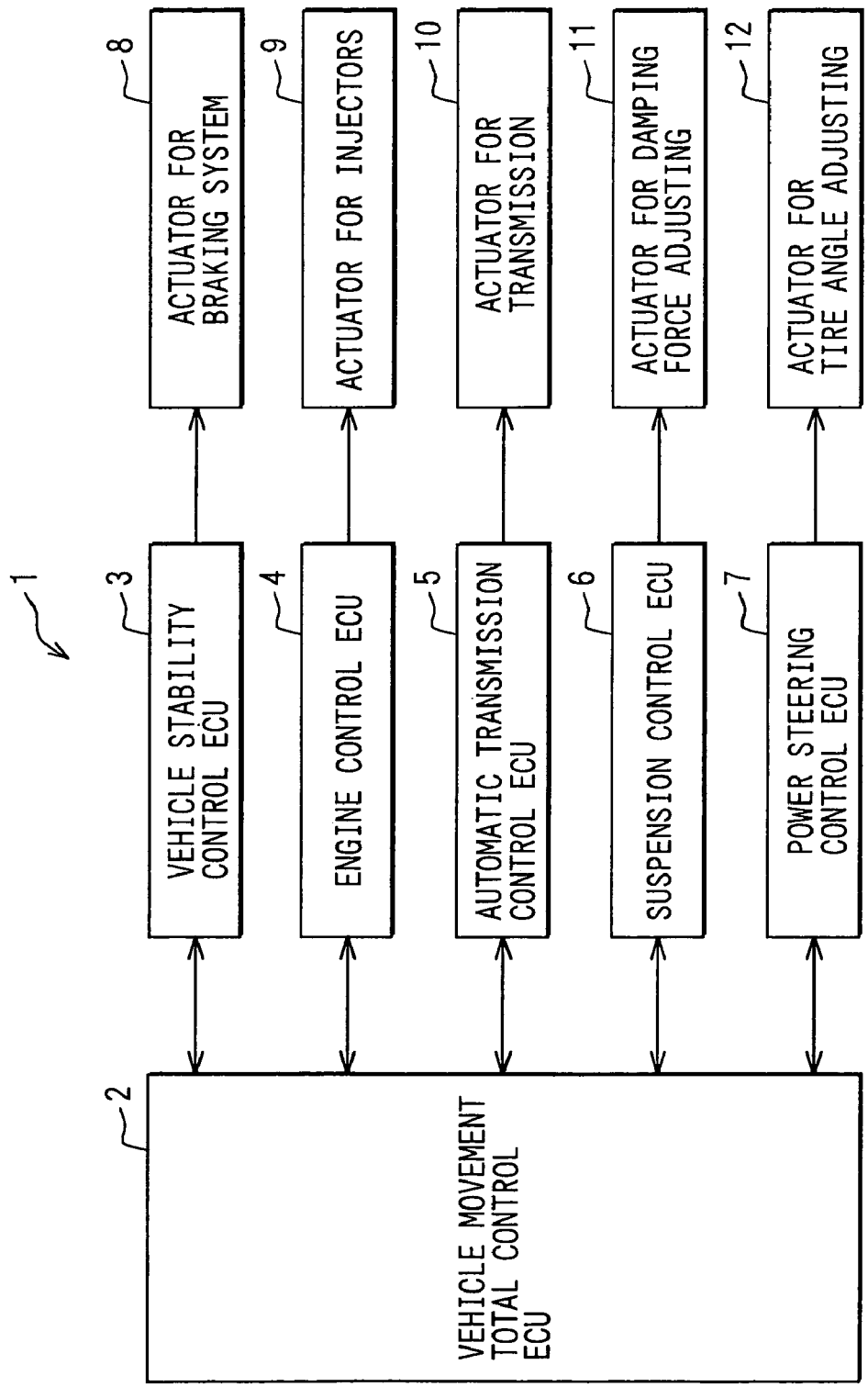
FIG. 1 is a block diagram showing a vehicle control system according to the present invention.

A vehicle total control device 1 comprises multiple vehicle control ECUs, such as ECU 3 for a vehicle stability control, ECU 4 for an engine control, ECU 5 for an automatic transmission control, ECU 6 for a suspension control, and ECU 7 for an electrical power steering control. The vehicle total control device 1 further comprises a vehicle movement total control ECU 2, which totalizes the above ECUs 3 to 7, calculates an optimum control method, and sends command signals to the respective ECUs 3 to 7 in accordance with the calculated optimum control method.

The respective ECUs 3 to 7 then send actuator driving signals to the respective actuators 8 to 12 in response to the above command signals from vehicle movement total control ECU 2. A numeral 8 is an actuator for a braking device, a numeral 9 is an actuator for injectors, a numeral 10 is an actuator for an automatic transmission device, a numeral 11 is an actuator for a damping force adjusting device, and a numeral 12 is an actuator for a tire angle adjusting device.

In the case that a vehicle is running straight ahead on a frozen road surface having a low friction coefficient at a right hand side of the vehicle and on an asphalt road surface having a high friction coefficient on a left hand side of the vehicle, a rotational moment is generated with respect to a center of mass of the vehicle when the vehicle is about to be accelerated by depressing an acceleration pedal. (In case of the vehicle with a front wheel drive, the vehicle tends to be rotated toward the road having the higher friction coefficient.) When a rotational (spinning) force is applied to the vehicle under a condition that no steering torque is existing, the vehicle movement total control ECU 2 determines that the vehicle is not running in a safe condition. Furthermore, the vehicle movement total control ECU 2 calculates a corrective torque which would cancel the rotational moment and outputs a command signal to the power steering control ECU 7, or outputs a command signal to the vehicle stability control ECU 3 so that the vehicle stability control ECU 3 drives the braking actuator 8 to apply a braking force to a front wheel of the side of the low friction coefficient, or outputs a command signal to the engine control ECU 4 so that fuel injection by the injectors 10 is cut off to suppress a vehicle driving force, or outputs a command signal to the automatic transmission control ECU 5 so that a transmission ratio is shifted down to reduce the vehicle driving force to be transmitted from the automatic transmission device to the driving wheels. Those controls are selectively and/or collectively performed by the vehicle movement total control ECU 2 depending on the vehicle running condition.

Figure 2:
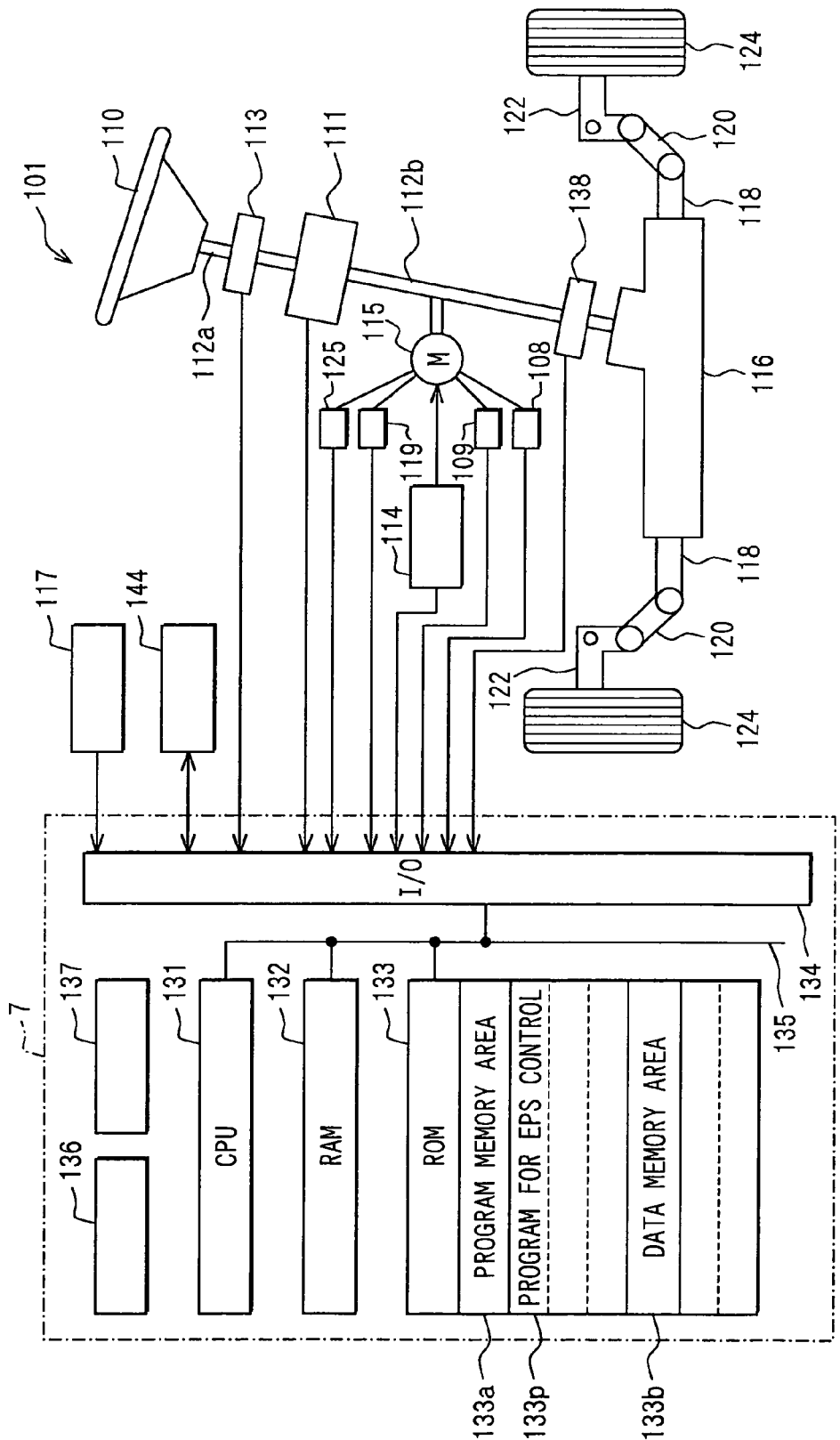
FIG. 2 is a schematic view showing an electrical power steering system according to the present invention.

FIG. 2 shows a schematic view of the electrical power steering device 101.

A steering wheel 110 is connected to a steering shaft 112a, at a lower end of which a torque sensor 111 is provided. An upper end of a pinion shaft 112b is connected to the torque sensor 111 and a lower end of the pinion shaft 112b is provided with a pinion (not shown). The pinion is engaged with rack bars 118 in a steering gear box 116. A pair of tie-rods 120 are connected to at each end to the rack bar 118, and connected at other ends to the respective tires (wheels) 124 through knuckle arms 122.

A steering assist motor 115 is operatively connected to the pinion shaft 112b.

The power steering control ECU (also referred to as EPS-ECU) 7 comprises a CPU 131, a RAM 132, a ROM 133, an I/O 134 (an interface for an input and an output), and a bus line 135 for connecting those components with each other. The CPU 131 performs its control in accordance with programs and data memorized in the ROM 133 and the RAM 132. The ROM 133 has a memory area 133a for the programs, in which a steering control program 133p is stored, and a data area 133b for memorizing data, in which data necessary for an operation of the steering control program 133p are stored.

The torque sensor 111 comprises a well-known torque detecting portion having a torsion bar, and so on. When the steering shaft 112a is rotated, a torque corresponding to such rotation of the steering shaft 112a is detected and information of the detected torque is transmitted to the power steering control ECU 7.

A rotation angle sensor 109 comprises a well-known resolver and so on. The rotation angle sensor 109 outputs a signal corresponding to a rotation of the steering assist motor 115 and the signal is likewise transmitted to the EPS-ECU 7. Furthermore, a motor current sensor 108, a motor voltage sensor 119 and a motor temperature sensor 125 are connected to respectively detect an electric (driving) current flowing in the motor 115, an electric voltage applied to the motor 115 and a temperature of the motor 115. The detected information are transmitted to EPS-ECU 7.

The power steering system further comprises a vehicle speed sensor 117 having a well-known speed detecting device, such as a rotary encoder, for detecting a vehicle speed. The EPS-ECU 7 further comprises a temperature sensor 136 for detecting a temperature of EPS-ECU 7, and a voltage detecting circuit 137 for detecting a power voltage applied to EPS-ECU 7.

The EPS-ECU 7 is connected to the vehicle movement total control ECU 2 by a communication means 144, so that EPS-ECU 7 and the vehicle movement total control ECU 2 are intercommunicated.

A steering angle sensor 138 having a detecting portion comprising a well-known rotary encoder is provided at a lower end portion of the pinion shaft 112b. The steering angle sensor 138 is connected to EPS-ECU 7 So that the detected information is inputted to the EPS-ECU 7.

Figure 3:
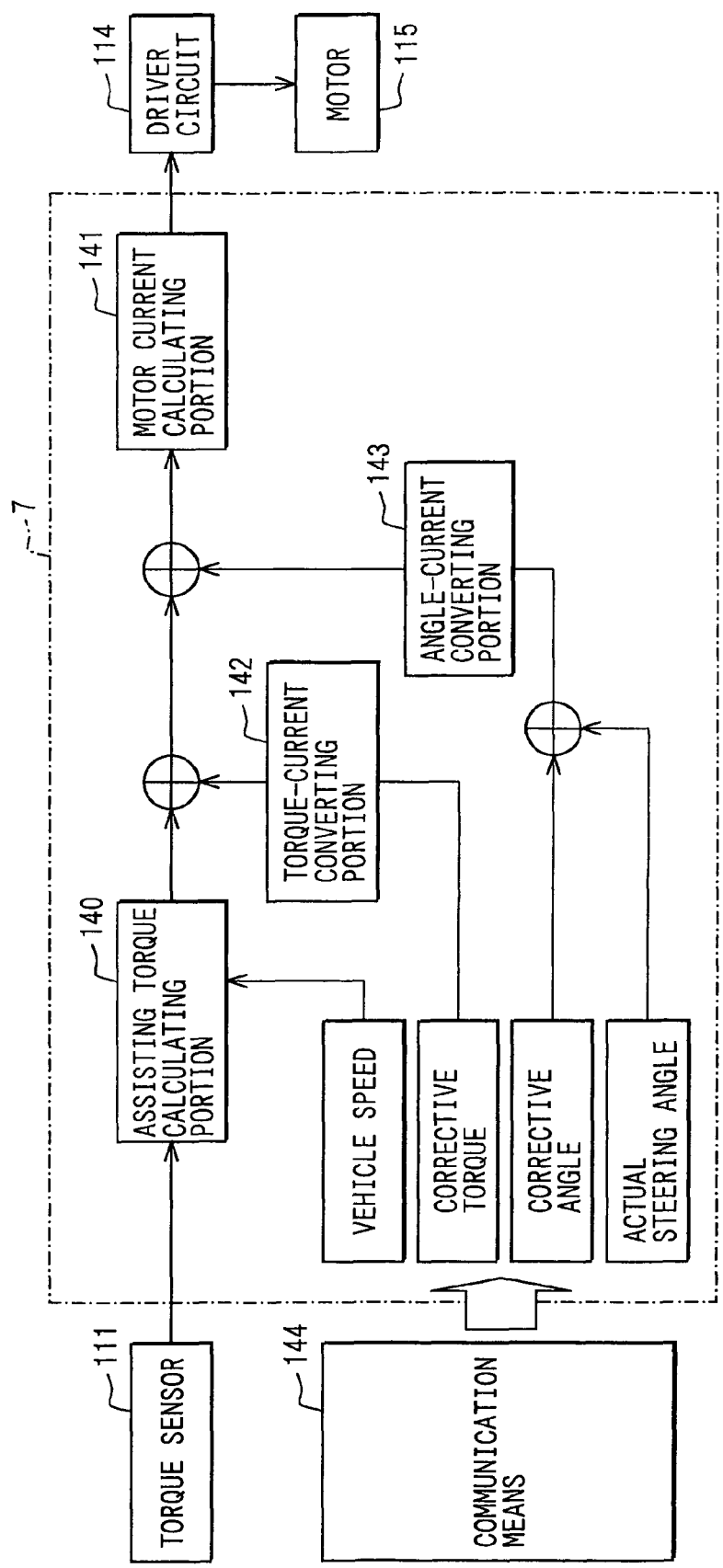
FIG. 3 is a schematic view showing an operation of a power steering control unit of the power steering system shown in FIG. 2.

A control for the steering assist motor 115 by the EPS-ECU 7 is explained with reference to FIG. 3. The CPU 131 of the EPS-ECU 7 performs the steering control program stored in the ROM 133 in accordance with the steering torque detected by the torque sensor 111 and the vehicle speed detected by the vehicle speed sensor 117. The CPU 131 thereby calculates, at an assisting torque calculation portion 140, an assisting torque from a map in which a relationship between the vehicle speed, the steering torque and the assisting torque to be generated at the steering assist motor 115 is defined. And then the CPU 131 calculates a basic current value I0, which is necessary for the steering assist motor 115 to generate the above calculated assisting torque.

Then, a torque-current converting portion 142 of EPS-ECU 7 calculates a corrective current value I1, which is necessary for the steering assist motor 115 to generate the corrective torque received from the vehicle movement total control ECU 2 via the communication means 144.

The EPS-ECU 7 calculates a variation between the corrective angle, which is received from the vehicle movement total control ECU 2 via the communication means 144, and a current steering angle of the steering wheel, which is derived out from the rotation angle detected by the rotation angle sensor 109. Then, an angle-current converting portion 143 of EPS-ECU 7 calculates a torque which would make the above variation become zero, and further calculates a corrective current value I2 which is necessary for the steering assist motor 115 to generate the torque.

A motor current calculating portion 141 of EPS-ECU 7 calculates a sum of the above basic current value I0, the corrective current value I1 and the corrective current value I2, and makes it as a final command current value.

A motor driver circuit 114 calculates a voltage to be applied to the steering assist motor 115 based on the final command current value, and finally the steering assist motor 115 is driven by such control voltage.

Figure 4:
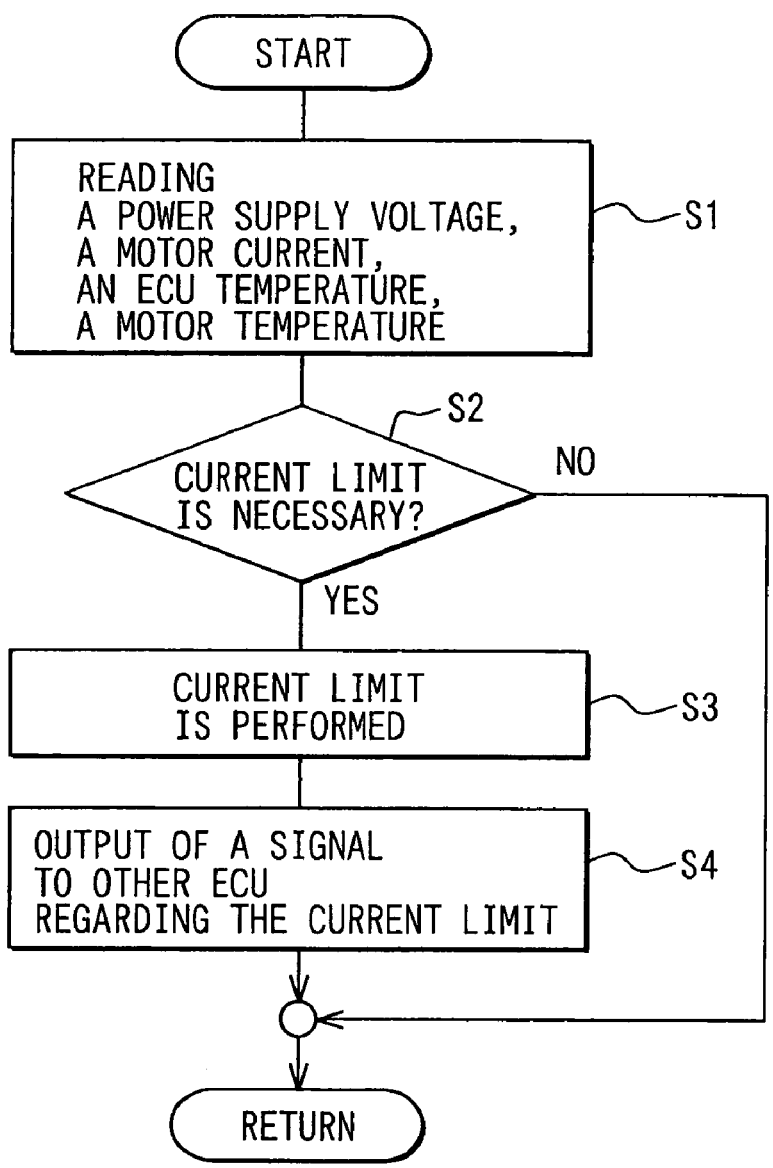
FIG. 4 is a flow-chart showing a process of the operation for the power steering control unit in case of limiting a driving current to a steering assist motor, according to a conventional system.

A conventional process by the EPS-ECU 7 for calculating the command current value is at first explained, for the purpose of better understanding of the present invention, with reference to FIG. 4.

At a step S1, a power supply voltage detected by the voltage detecting circuit 137, a motor current detected by the motor current sensor 108, a temperature of EPS-ECU 7 detected by the temperature sensor 136, a motor temperature detected by the motor temperature sensor 125 are read in the EPS-ECU 7.

At a step S2, it is respectively determined whether each of the detected amounts or values is within a predetermined normal operating range, in which any current limitation is not necessary.

In a case that, at the step S2, all of those detected amounts or values are respectively within the normal operating ranges, the process is ended.

In a case that, on the other hand at the step S2, any one of those detected amounts or values is not within the normal operating ranges, the current limit process is performed at a step S3.

And finally, at a step S4, the EPS-ECU outputs a signal to the other ECU (the vehicle movement total control ECU 2) transmitting information that the motor current is limited.

Figure 5:
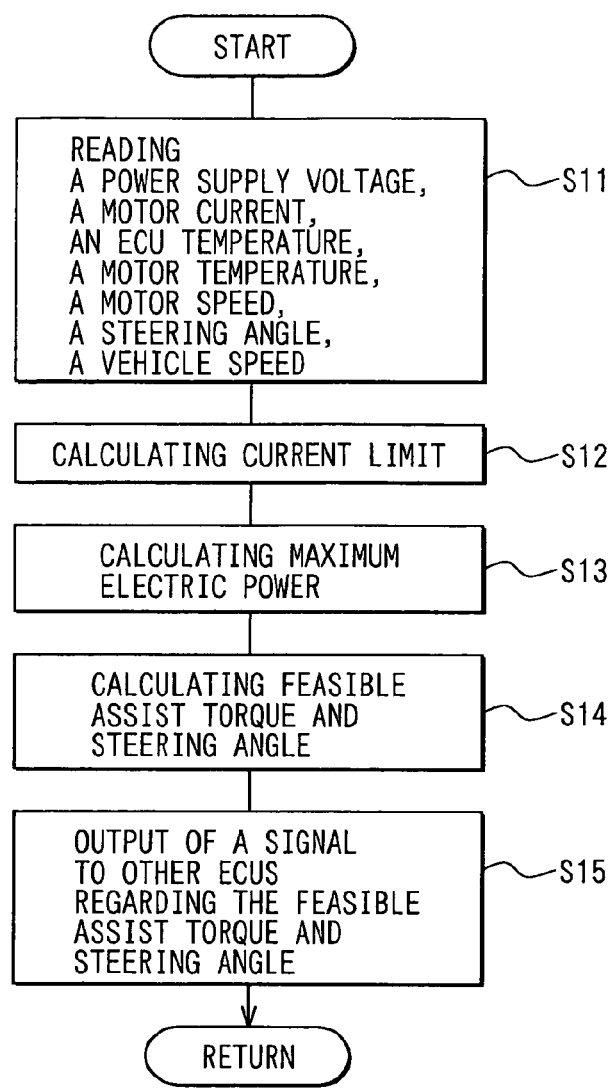
FIG. 5 is likewise a flow-chart showing a process of the operation for the power steering control unit in case of limiting a driving current to a steering assist motor, according to the present invention.

A process by the EPS-ECU 7 for calculating the command current value according to the embodiment of the present invention is explained with reference to FIG. 5.

At a step S11, a power supply voltage detected by the voltage detecting circuit 137, a motor current detected by the motor current sensor 108, a motor voltage detected by the motor voltage sensor 119, a temperature of EPS-ECU 7 detected by the temperature sensor 136, a steering angle detected by the steering angle sensor 138 for the tire 124, a rotational number of the steering assist motor 115 by the rotation angle sensor 109, a motor temperature detected by the motor temperature sensor 125 are read in the EPS-ECU 7.

Then, an output power of the steering assist motor 115 is calculated based on the detected motor current and the motor voltage. And the rotation of the steering assist motor 115 is calculated based on the steering angle of the tire 124. Since the pinion shaft 112b is rotated by a predetermined angle and at a speed, which is reduced from the rotational speed of the steering assist motor 115 by a predetermined ratio, and the tire 124 is pivoted by a predetermined angle determined by the rotation of the pinion shaft 112b, the rotation of the steering assist motor 115 can be calculated back from the steering angle of the tire 124.

It is determined, at a step S12, whether any of the detected amounts (the power supply voltage, the motor current, the motor voltage, the ECU temperature, the motor temperature, the rotation of the motor, and the output power of the steering assist motor) is respectively within a predetermined operating range.

In the case that, all of those detected amounts are respectively within the normal operating ranges, the motor current (I) is calculated according to a normal process.

In the case that, any one of those detected amounts is not within the normal operating ranges, the motor current (I) to be applied to the steering assist motor 115 is limited to a predetermined amount.

An upper limit value of the current limit to the steering assist motor 115 varies depending on a condition, which of those current limiting parameters (the power supply voltage, the motor current, the ECU temperature, the motor temperature, and the rotation of the motor) is (are) not within its (their) normal operating range(s). For example, in the case that more than two of those current limiting parameters are not within their normal operating ranges, the smallest value is selected as the upper limit value of the current limit.

Then, the process goes to a step S14 (A step S13 will be explained later.).

Figure 8:
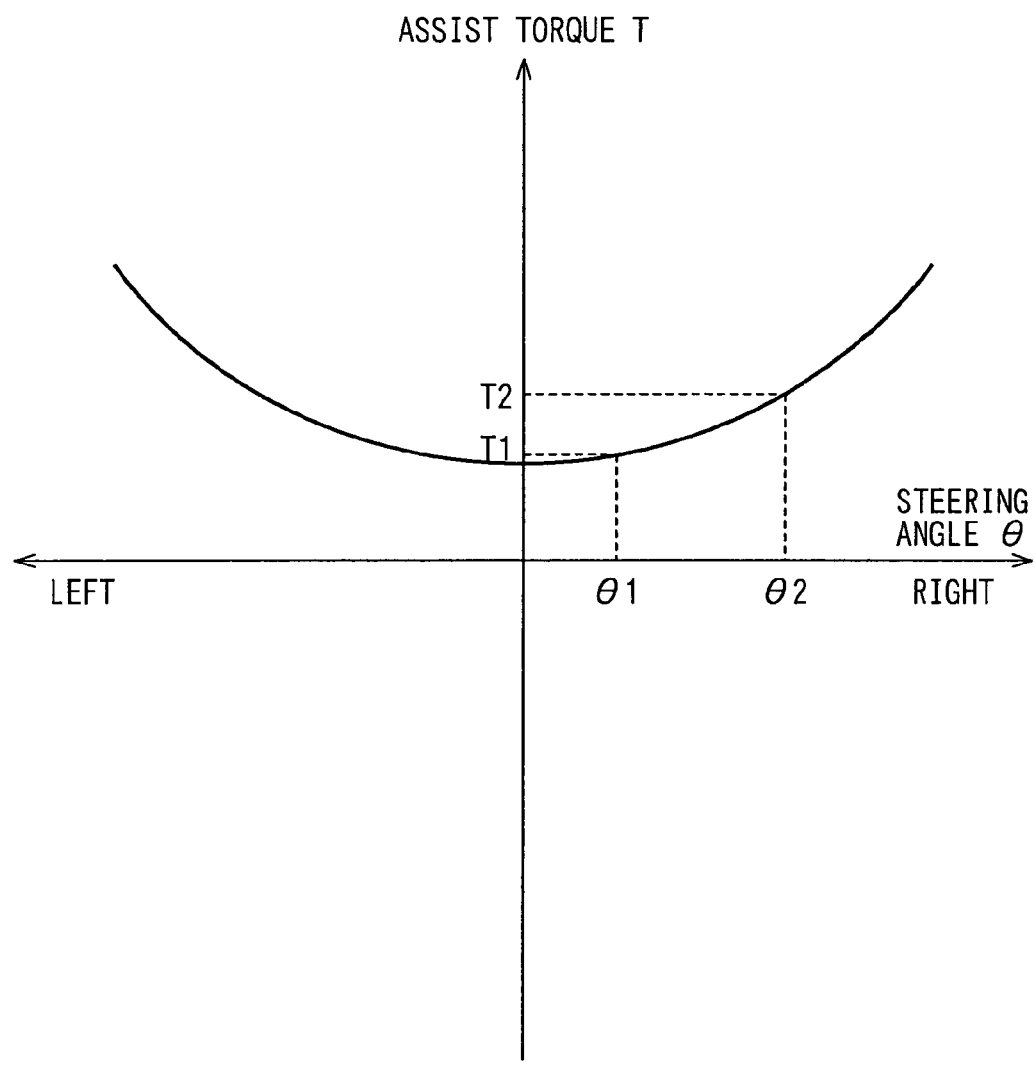
FIG. 8 is a diagram showing a relationship between a steering assist torque and a steering angle for a steering tire wheel.

At this step S14, a feasible steering angle as well as assist torque is calculated. Since the assist torque and the motor current (I) have a predetermined relation depending on a characteristic of the steering assist motor 115, the assist torque can be calculated based on the motor current (I). Furthermore, the assist torque (T) and the steering angle (θ) have a predetermined relation, as shown in FIG. 8. Accordingly, when the feasible assist torque is at T2, the feasible steering angle becomes θ2.

The feasible steering angle can be alternatively calculated based on a map memorized in the ROM 133 or RAM 132, in which a relationship between the steering angle and the assist torque is predetermined.

At a step S15, the above calculated assist torque (T) to be applied to the steering assist motor 115 as well as the steering angle for the tire 124 is sent to the vehicle movement total control ECU 2 via the communication means 144. Then, the ECU 2 outputs a command signal to the EPS-ECU 7, which is calculated in the ECU 2 based on the above information regarding the assist torque (T) and the steering angle.

The feasible assist torque and the steering angle of the tire 124 can be alternatively calculated from a feasible output power of the steering assist motor 115, which is calculated from the motor current (I) and the motor voltage to be applied to the steering assist motor 115.

In general, an output power (P) of an electric motor is equal to an integrated value of a back electromotive force (E) and a motor current (I), and is in proportion to an integrated value of an assist torque and a rotational speed of the electric motor. The above relationships are expressed in the following mathematical formulas:

$$P = Vm \cdot I \ldots \quad (1)$$

$$\omega = E/K = (Vm - R \cdot I)/K \quad (2)$$

In the above formulas, R is an internal resistance of the electric motor, and K is a constant of the back electromotive force of the electric motor. $\omega$ is a rotational angular speed of the electric motor. Vm is a voltage to be applied to the electric motor, and I is a current to be applied to the electric motor.

As the alternative process, at the step S13, the feasible output power of the steering assist motor 115 is calculated from the above formula (1), and the rotational angular speed can be calculated from the formula (2).

The relationship among the output power (P) of the electric motor, the torque (T) generated at the motor (=the assist torque) and the rotational angular speed ($\omega$) can be expressed in the following formula:

$$P = T \cdot \omega$$

Accordingly, the feasible assist torque (T) can be calculated from the values of the feasible output power (P) of the electric motor (the steering assist motor 115) and the rotational angular speed ($\omega$).

And finally, the feasible steering angle ($\theta$) for the tire 124 can be calculated from FIG. 8.

In the above calculation process, the rotational angular speed ($\omega$) can be alternatively calculated as a differentiated value of the rotational speed of the rotation angle sensor 109 (namely, a variation of the rotation angles during a unit time interval).

In the above operation, the feasible steering angle ($\theta 2$ in FIG. 8) and the feasible assist torque (T2 in FIG. 8) are inputted into the vehicle movement total control ECU 2. As an alternative process, each of an excess amount ($\theta 2-\theta 1$) for the steering angle and (T2-T1) for the assist torque in FIG. 8 can be inputted into the ECU 2.

Figure 6:
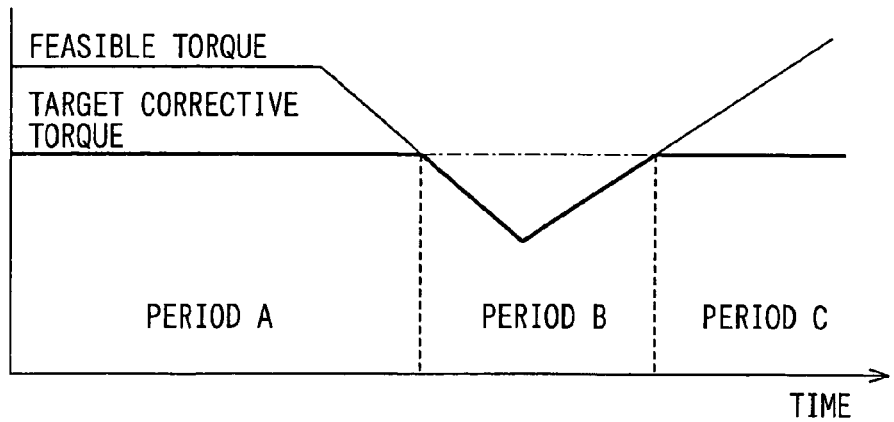
FIG. 6 is a diagram showing a relationship between a target torque and a feasible torque with respect to a time.

FIG. 6 shows the feasible torque (the torque to be generated at the steering assist motor 115) and a target corrective torque (a sum of the torque based on the command signal from the vehicle movement total control ECU 2 and a request torque calculated based on the information from the torque sensor 111), with respect to a time. During a period of B, in which current limit to the motor is necessary due to an increase of the motor temperature and so on, the target corrective torque is limited by the feasible torque, as shown in FIG. 6. The torque coming short in the period B is covered by other control systems. In the periods A or C, in which no current limit to the motor is necessary, the target corrective torque is not limited by the feasible torque.

In a conventional system, no operation or no process for the power steering control is done, and no command signal is outputted from the vehicle movement total control ECU 2, during the period B. Even if the command signal is inputted into the power steering control device (the ECU 7 for the power steering control), no further process is actually done, because the current limit to the motor is being carried out.

On the other hand, according to the present invention, the steering assist motor 115 can be continuously operated within the range of the feasible torque. And a difference between the feasible torque and the target corrective torque can be covered by the other control systems. As a result, an uncomfortable feeling for driving to a driver can be minimized.

The above operation is explained when the motor temperature is increased to a higher value beyond the normal operating range and thereby the driving current to the steering assist motor (115) is limited by the feasible torque. Such current limit is, however, also necessary in other situations.

For example, a temperature of the power steering unit (7) or a temperature of a portion adjacent to the power steering unit (7) is varied by a temperature of a power supply circuit of the unit (7). When the temperature of the power supply circuit is increased, a capability of power supply is reaching its critical limit. And therefore, the power supply to the steering assist motor (115) should be reduced.

When an excessive amount of the driving current is supplied to the steering assist motor (115), the motor temperature is also increased. And therefore, the current limit is also necessary in such a case.

The power steering system changes the motor assist torque depending on a vehicle speed, even when the steering angle of the wheels 124 is the same. Namely, when the vehicle speed is high, the motor assist torque is small, whereas when the vehicle speed is low, the motor assist torque is high. Since the torque generated at the electric motor and the driving current to the electric motor have a certain relationship, the necessary torque by the electric motor is decreased in proportion to the increase of the vehicle speed. And thereby, the driving current to the electric motor is limited (reduced) to such an amount, with which the necessary torque is generated at the electric motor.

As in the above cases, in which the driving current to the steering assist motor 115 is limited, a difference between the feasible torque and the target corrective torque can be covered by the other control systems. As a result, an uncomfortable feeling for driving to a driver can be minimized.

In the above embodiment, the information of the calculated feasible torque at the steering assist motor 115 is transmitted to the vehicle movement total control ECU 2, so that any difference between the target torque and the feasible torque can be compensated by other control systems. It is also possible to send to the vehicle movement total control ECU 2, information of the assist torque actually applied to the power steering device in stead of the information of the calculated feasible torque.

Figure 7:
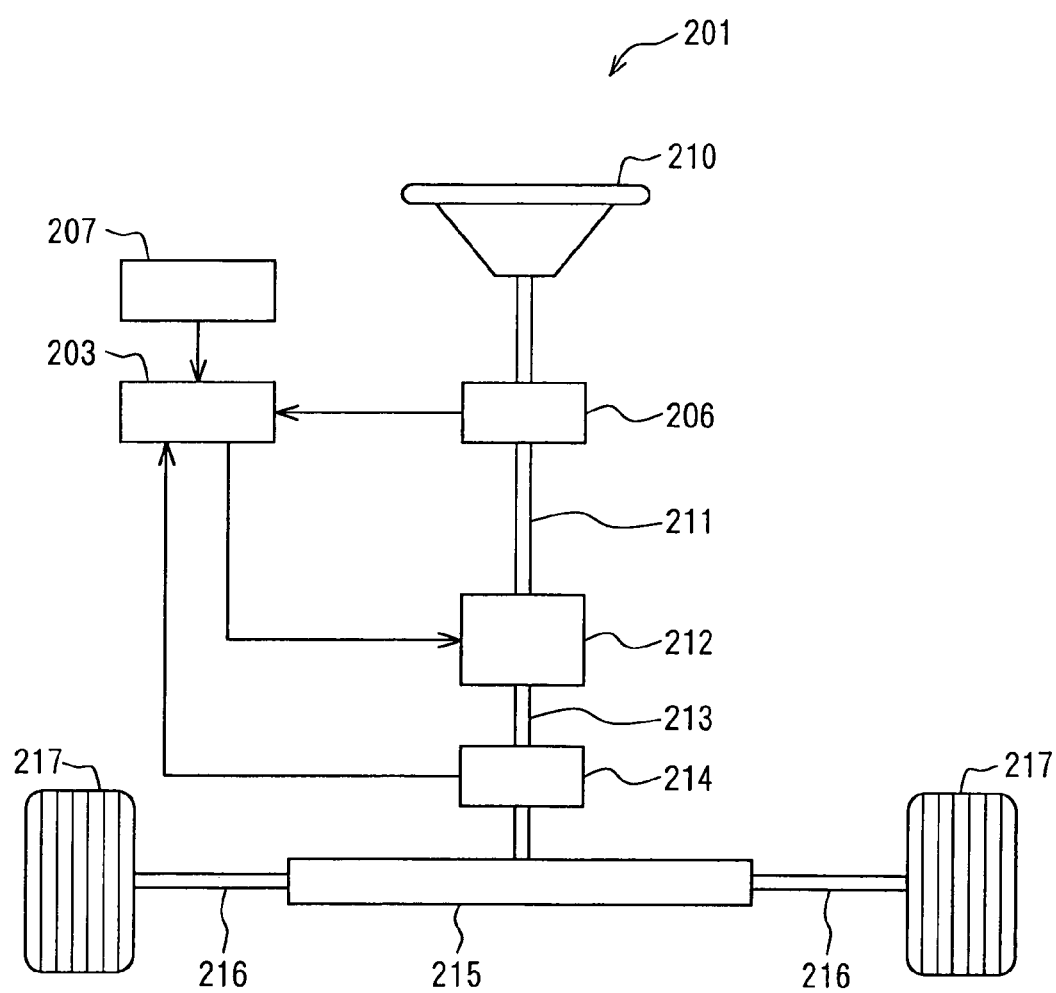
FIG. 7 is a schematic view of another embodiment of the present invention.

FIG. 7 shows another embodiment of the present invention, wherein a numeral 211 designates an input shaft (the steering shaft) connected at its upper end with the driver's wheel (steering wheel) and at its lower end with a transfer ratio changing unit 212. An output shaft 213 (the pinion shaft) is connected to the transfer ratio changing unit 212 at its upper end and connected at its lower end to a pinion (not shown) provided in a steering gear box 215. The pinion is engaged with rack bars 216 in the steering gear box 215. Although not shown in the drawing, each end of the rack bars 216 is operatively linked with a tire 217 via a tie-rod and a knuckle arm.

An electrical power steering device is provided in the steering gear box 215.

A first rotational angle sensor 206 is provided on the input shaft 211 (the steering shaft) for detecting a rotational angle of the input shaft 211. A second rotational angle sensor 214 is provided on the output shaft 213 for detecting a rotational angle of the output shaft 213 and thereby detecting a steering angle of the tire 217, wherein the second rotational angle sensor 214 comprises a resolver. The second rotational angle sensor 214 can be provided in the steering gear box 215.

The detected rotational angles of the input and output shafts 211 and 213 by the respective sensors 206 and 214 are transmitted to a transfer ratio control unit 203, to which information of a vehicle speed and an engine rotational speed are inputted from a vehicle LAN 207. The control unit 203 outputs a control signal to the transfer ratio changing unit 212.

The transfer ratio changing unit 212 comprises a well-known brushless motor and reduction gears, and changes the rotational angle of the output shaft 213 depending on the control signal from the transfer ratio control unit 203 by driving the blushless motor.

In the above embodiment, the transfer ratio control unit 203 calculates a target rotational angle for the output shaft 213, in accordance with the vehicle speed from the vehicle LAN 207 and the rotational angle of the input shaft 211 from the first rotational angle sensor 206. Then, a motor command signal of PWM (Pulse Width Modulation) corresponding to the target rotational angle is outputted from the transfer ratio control unit 203 to the transfer ratio changing unit 212, so that the motor is rotated. As a result, the output shaft 213 is rotated by such an angle, which is a sum of an angle rotated by the input shaft 211 (the steering wheel 210) and an angle rotated by the motor of the transfer ratio changing unit 212. The steering angle of the tire 217 is thereby controlled corresponding to the rotation of the output shaft 214.

The rotational angle of the output shaft 213 is detected by the second rotational angle sensor 214 and its detected angle is transmitted to the transfer ratio control unit 203, wherein the control unit 203 figures out an actual steering angle of the tire 217, so that the transfer ratio control unit 203 controls to make the steering angle become equal to the target value, in its feedback control.

As in the same manner to the first embodiment of the present invention, it may become necessary in some cases to limit a driving current to the brushless motor of the transfer ratio changing unit 212, when a power voltage is decreased, a motor temperature is increased and so on. When such a situation happens, the transfer ratio control unit 203 calculates a feasible torque to be generated at the brushless motor and drives the same at such feasible torque and the information of this operation under the current limit is transmitted to a vehicle movement total control ECU (not shown in FIG. 7) so that a difference between the target value and the feasible value for controlling the transfer ratio changing unit can be compensated by other vehicle control systems. As a result, a harmonized vehicle control as a whole can be achieved.

What is claimed is:

1. An electrical power steering system for a vehicle comprising:
   a steering assist electric motor for applying a steering assist torque to a pinion shaft operatively linked with tires;
   a steering sensor for detecting a steering operation of a steering wheel; and
   a power steering control unit for receiving a command signal from a vehicle movement total control unit and for calculating a target assist torque from a steering signal from the steering sensor and the command signal, wherein
   (a) the power steering control unit determines whether the steering assist electric motor is in a current-limiting condition in which motor current to the assist electric motor is limited to a predetermined amount,
   (b) in a case in which the steering assist electric motor is not in the current-limiting condition, the power steering control unit calculates the motor current based on the target assist torque and further calculates based on the motor current a first feasible assist torque to be generated at the steering assist electric motor,
   (c) in a case in which the steering assist electric motor is in the current-limiting condition, the power steering control unit calculates the motor current based on the target assist torque, wherein the motor current is limited to the predetermined amount, and the power steering control unit further calculates a second feasible assist torque based on such limited motor current,
   (d) the power steering control unit transmits to the vehicle movement total control unit information of the second feasible assist torque,
   (e) in a case in which the power steering control unit determines that the steering assist electric motor is not in the current-limiting condition, the vehicle movement total control unit transmits to the power steering control unit a first command signal, which is not influenced by the first feasible assist torque, so that the steering assist electric motor is driven without current limitation,
   (f) in a case in which the power steering control unit determines that the steering assist electric motor is in the current-limiting condition, the vehicle movement total control unit transmits a second command signal to the power steering control unit so that the steering assist electric motor is driven at the second feasible assist torque, even when the second feasible assist torque is lower than the target assist torque,
   (g) when the vehicle movement total control unit transmits the second command signal to the power steering control unit so that the steering assist electric motor is driven at the second feasible assist torque, the vehicle movement total control unit further outputs a third command signal to at least one other vehicle control unit of a plurality of other vehicle control units of the vehicle,
   (h) the plurality of other vehicle control units includes a vehicle stability control unit for controlling actuators of a braking system of the vehicle,
   (i) the at least one vehicle control unit is separately provided in the vehicle from the electrical power steering system, and
   (j) the third command signal is in accordance with the transmitted information of the second feasible torque, and
   (k) the vehicle movement total control unit performs a coordinated control at least between the electrical power steering system and the other vehicle control unit, so that a difference between the second feasible torque and the target assist torque is covered by the other vehicle control unit.

2. An electrical power steering system according to claim 1, wherein the power steering control unit calculates each of the first and second feasible assist torques to be generated at the steering assist electric motor, based on, in addition to the motor current, at least one of the following parameters:
   a power voltage to be applied to the power steering control unit,
   a temperature of or a temperature of a portion adjacent to the power steering control unit,
   a temperature of the steering assist electric motor,
   a rotational speed of the steering assist electric motor, and
   a running speed of the vehicle.

3. An electrical power steering system according to claim 1, wherein the information of the feasible torque to be transmitted from the power steering control unit to the vehicle movement total control unit can be replaced by the steering assist torque which is actually generated at the steering assist electric motor.

4. An electrical power steering system according to claim 1, further comprising a steering angle sensor for detecting an actual angle of the tires, wherein the power steering control unit calculates the target assist torque from the actual angle of the tires.

5. An electrical power steering system according to claim 4, wherein the power steering control unit calculates the target assist torque from the actual angle of the tires, based on a map defining a relationship between the actual angle of the tires and the steering assist torque.

* * * * *